July 6, 1926.

W. AMES

SETTING TOOL FOR GAUGES

Filed August 20, 1923

1,591,259

Inventor:
Warren Ames,
by his atty. Charles S. Gooding.

Patented July 6, 1926.

1,591,259

UNITED STATES PATENT OFFICE.

WARREN AMES, OF WALTHAM, MASSACHUSETTS, ASSIGNOR TO B. C. AMES CO., OF WALTHAM, MASSACHUSETTS, A CORPORATION OF MASSACHUSETTS.

SETTING TOOL FOR GAUGES.

Application filed August 20, 1923. Serial No. 658,210.

This invention relates to a setting tool for gauges and has for its object to provide a tool for setting or checking measuring instruments, such as cylinder gauges, for predetermined sizes, said tool being so constructed that it may also be utilized as a handle for said cylinder gauge.

The invention consists in the combination and arrangement of parts set forth in the following specification and particularly pointed out in the claims thereof.

Referring to the drawings.

Like numerals refer to like parts throughout the several views of the drawings.

Figure 1:
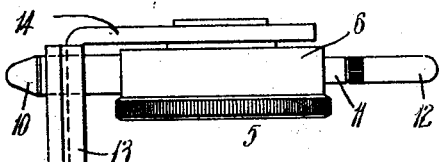
Figure 1 represents a side elevation of a cylinder gauge of well known construction, a setting tool embodying the invention being incorporated as a portion of the handle for said cylinder gauge.

In the drawings, 5 represents a cylinder gauge of well known construction, said gauge embodying therein a casing 6 and a dial 7 upon which are suitable graduations 8 preferably representing one thousandths of an inch and an indicating hand 9 which registers with said graduations. The cylinder gauge also embodies therein a stationary contact member 10 and a yielding contact member 11, the latter being diametrically opposite the former and having a detachable contact point 12 mounted therein, said contact point being one of a number of contact points of different lengths which may be utilized with the cylinder gauge.

The cylinder gauge 5 is mounted upon a suitable base or support 13, the casing 6 of said gauge having sliding engagement with an extension 14 of said base. The base 13 is provided with parallel edges 15 and 16 which are adapted to engage the interior bore of a cylinder and thereby position the longitudinal median line of the contact members 10 and 11 upon the exact diameter of said cylinder.

In manipulating the cylinder gauge hereinbefore described, it is desirable that a handle be employed and it is in this handle and its application to a cylinder gauge that the novel features of this invention reside. The handle represented at 17 embodies therein a rod 18 which is loosely attached to the base 13 at 19 in a manner to permit a limited universal movement between the handle and base, and a hollow gripping member 20. Rigidly mounted at one end of the gripping member 20 is a setting finger 21, a portion of the latter preferably projecting into the interior of the gripping member 20 at 22 and being pinned to said member. The rod 18 is detachably secured to the setting finger 21 at 23. The gripping member 20 is provided with a chamber 24 upon the interior thereof in which may be located a plurality of the contact points 12.

Detachably mounted at the other end of the gripping member 20, preferably by having screw-threaded engagement therewith, is a member 25 and said member is shouldered at 26 thereby forming a reduced portion 27 upon which a setting finger 28 and spacing members 29, 30, 31 and 32 are mounted, the gripping member 28 and member 25 thus forming a beam carrying the spaced fingers 21 and 28. The reduced portion 27 of the member 25 is flattened at 33 and the finger 28 is provided with an opening extending therethrough which is flattened at 34 to fit the reduced portion 27, thereby making it impossible for said finger to rotate upon said reduced portion. The finger 28 projects laterally from the member 25 and aligns with the setting finger 21 previously described. The setting finger 28 and spacing members 29, 30, 31 and 32 are all clamped together and against the shoulder 26 through the medium of a suitable nut 35 which has screw-threaded engagement with the reduced portion 27 of the member 25. It is evident that there may be any number of spacing members desired and said members may be of varying lengths according to the nature of the work for which the cylinder gauge is to be used.

Figure 2:
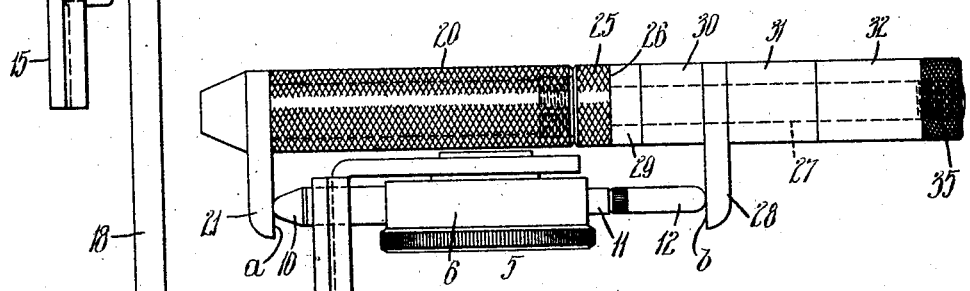
Fig. 2 represents a side elevation of the cylinder gauge and setting tool, the latter being disconnected from the former and illustrated applied to the gauge in the position it assumes when the cylinder gauge is being set.
Figure 4:
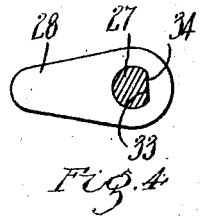
Fig. 4 is a detail transverse section as taken on the line 4—4 of Fig. 1.
Figure 3:
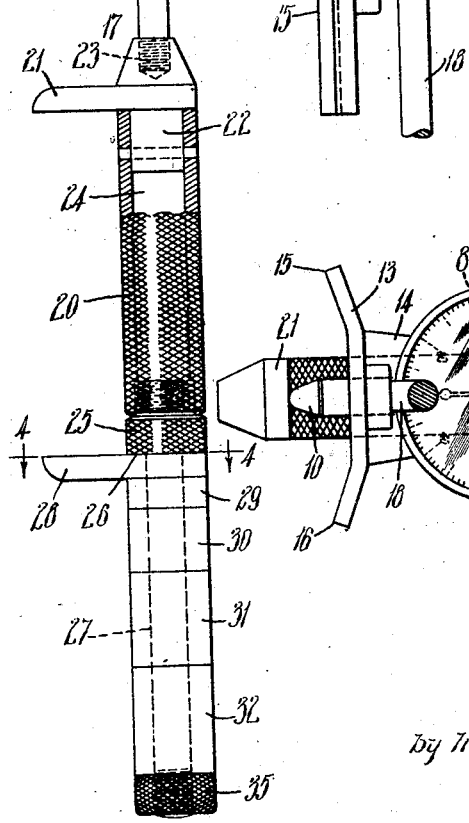
Fig. 3 is a front elevation of the cylinder gauge and setting tool, each being positioned relatively to the other as illustrated in Fig. 2.

The general operation of the device hereinbefore described is as follows:—Assuming that the cylinder gauge 5 and handle 17, which latter embodies therein the setting tool, are all assembled as illustrated in Fig. 1, and it is desired to measure the diameter of the bore of a cylinder, the first step is to remove the portion of the device which constitutes the setting tool by disconnecting the latter from the rod 18 at 23. The nut 35 is then removed from the reduced portion 27 of the member 25 and the spacing members 29, 30, 31 and 32 and setting finger 28 are rearranged as required to make the distance between the faces $a$ and $b$ of the setting fingers 21 and 28 respectively equal to the exact diameter of the bore to be measured. A contact point 12 is then attached to the yielding contact member 11 which will make the distance between the extremities of the contact points 10 and 12 equal the distance between the surfaces $a$ and $b$ of the setting fingers 21 and 28. The cylinder gauge is now positioned between the fingers 21 and 28 of the setting tool, as illustrated in Figs. 2 and 3 and the dial 7 adjusted in a well known manner, so that the indicating hand 9 will register zero, as illustrated in Fig. 3. The setting tool is then again attached to the rod 18 and utilized as a handle for the cylinder gauge and when said cylinder gauge is inserted in the bore of the cylinder, the dial 7 will show the amount of over or under sizes in said cylinder as compared to the distance between the surfaces $a$ and $b$ of the setting tool.

I claim:

1. A setting tool for gauges comprising in combination, a beam having a reduced portion forming a shoulder intermediate the length of the beam, a fixed setting finger carried by said beam at one end thereof, a movable setting finger having an opening through which said reduced portion extends, said opening formed to spline said finger to said reduced portion for sliding movement along said portion, a plurality of sleeves on said reduced portion, and a member in screw threaded engagement with said reduced portion for clamping against said shoulder said sleeves and movable setting finger.

2. A setting tool for gauges comprising, in combination, a gripping member, a setting finger rigidly mounted upon said gripping member and projecting laterally therefrom at one end thereof, a member detachably mounted upon said gripping member at the other end thereof, a second setting finger mounted upon said detachably mounted member and projecting laterally therefrom and a plurality of spacing members also mounted upon said detachably mounted member and adapted to vary the distance between said spacing fingers.

3. A setting tool for gauges comprising, in combination, a gripping member, a setting finger rigidly mounted upon said gripping member and projecting laterally therefrom at one end thereof, a member detachably mounted upon said gripping member at the other end thereof, a second setting finger mounted upon said detachably mounted member and projecting laterally therefrom, a plurality of spacing members also mounted upon said detachably mounted member and adapted to vary the distance between said setting fingers, and means to clamp said gripping member, setting fingers and spacing members together.

4. A setting tool for gauges comprising, in combination, a hollow gripping member, a setting finger rigidly mounted upon said gripping member and projecting laterally therefrom at one end thereof, a member having screw-threaded engagement with said gripping member at the other end thereof, said member being provided with a shoulder and reduced portion, a second setting finger adjustably mounted upon said reduced portion and projecting laterally therefrom, a plurality of spacing members also mounted upon said reduced portion and adapted to vary the distance between said setting fingers and means to clamp said adjustable setting finger and said spacing members against said shoulder.

5. A setting tool for gauges comprising in combination, means forming a beam having a reduced portion provided with at least one flat splining surface extending longitudinally thereof, said reduced portion forming a shoulder intermediate the length of the beam, a setting finger carried by said beam at one end thereof, a movable setting finger having an opening through which said reduced portion extends, said opening formed to present a surface on a portion integral with said finger for coaction with said splining surface whereby said finger is splined to said reduced portion for sliding movement along said portion, a plurality of sleeves on said reduced portion, and a member in screw threaded engagement with said reduced portion for clamping against said shoulder said sleeves and movable setting finger.

6. A setting tool for gauges comprising in combination, a beam, a pair of laterally projecting setting fingers carried by said beam, at least one of said setting fingers being removable from said beam and having an opening through which said beam extends, said opening being formed to provide means for splining said finger to said beam, a plurality of removable spacing sleeves carried by said beam whereby by rearrangement of said sleeves relatively to said spacing fingers the latter may be positioned on said beam at various predetermined distances apart, and a clamping member in screw threaded engagement with an end portion of said beam for holding said spacing sleeves and said setting finger splined to said beam in assembled relation.

In testimony whereof I have hereunto set my hand.

WARREN AMES.